B. C. YOUNG.

BUCKLE.

No. 7,712. Reissued May 29, 1877.

Witnesses.
Sam'l M. Barton
H. S. Kimball

Inventor
Barker C. Young
by his Attys.
Carroll D. Wright & H. Brown.

N. PETERS, PHOTO-LITHOGRAPHER, WASHINGTON, D. C.

UNITED STATES PATENT OFFICE.

BARKER C. YOUNG, OF BOSTON, MASSACHUSETTS.

IMPROVEMENT IN BUCKLES.

Specification forming part of Letters Patent No. 162,211, dated April 20, 1875; reissue No. 7,712, dated May 29, 1877; application filed January 6, 1877.

*To all whom it may concern:*

Figure 1:
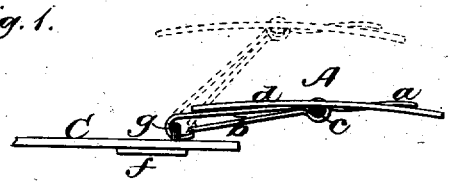
Figure 2:
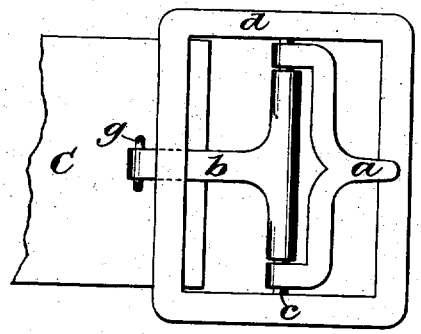
Figure 3:
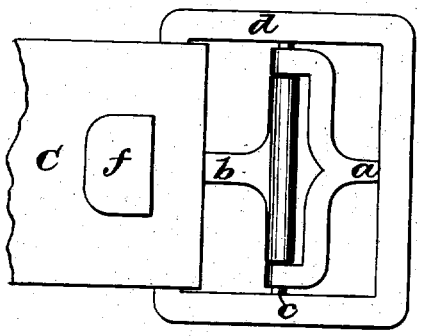
Figure 4:
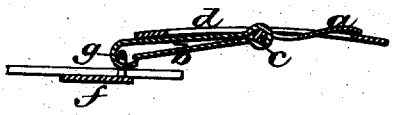
Figure 5:
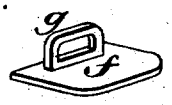

Be it known that I, BARKER C. YOUNG, of Boston, in the county of Suffolk and State of Massachusetts, have invented a new and useful Improvement in Buckles, of which the following is a specification:

In the accompanying drawings, which form a part of this specification, Figure 1 represents an edge view of a buckle embodying my invention. Figs. 2 and 3 represent views of the upper and lower sides of the same. Fig. 4 represents a sectional view of the same, and Fig. 5 represents a perspective view of an improved device for attaching the buckle to the article on which it is to be used.

Similar letters of reference in the different figures of the drawing refer to like parts.

This invention is an improvement on that class of shoe-buckles which are known as three-part buckles, and are composed of a buckle-frame having a central cross-bar, a tongue jointed to the cross-bar, and a plate adapted for attachment to the article on which the buckle is to be used, this plate being jointed to the cross-bar independently of the tongue, and riveted or clamped to the shoe. In connecting a strap to buckles of this class it is necessary to move the buckle-frame away from the surface of the shoe on which it rests when in use, in order that the strap may be passed under the front and rear bars of the frame. This movement, however, is rendered somewhat difficult by the limited outward play which is afforded by the above-described construction, the attaching-plate having to be drawn outwardly at one end when the buckle is drawn away from the shoe, this operation necessitating the bending of the leather at the point where the plate is attached thereto, and therefore involving some resistance to the outward movement of the buckle. Hence the strap cannot be secured to the buckle with the facility that is desirable, especially when the buckle-frame is curved, as usual, to adapt it to rest snugly at all points against the foot.

My invention has for its object to enable buckles of the class above named to be moved freely away from the shoe without bending the leather to which the attaching-plate is secured, and thus facilitate the connection of the strap to the buckle.

To this end my invention consists in the interposition of an intermediate connecting-hook between the attaching-plate and the cross-bar of a tongue-buckle, said hook being jointed both to the attaching-plate and to the cross-bar, independently of the tongue, in such manner as to allow the buckle to be raised freely without bending the leather to which the attaching-plate is secured.

My invention further consists in the combination of the hook and buckle with an attaching-plate, all of which I will now proceed to describe.

In the drawing, A represents a buckle of the ordinary construction as to the buckle-frame *d* and tongue *a*, the latter being jointed, as usual, to the cross-bar *c* of the buckle-frame. B represents the attaching-plate, which is adapted to be securely fastened to the material of the boot or shoe. The attaching-plate, instead of being jointed directly to the cross-bar *c* of the buckle-frame, as usual, is connected thereto by an intermediate hook, *b*, which, in the present instance, is composed of a detachable hook, jointed to the cross-bar *c* independently of the tongue *a*, and is adapted to engage at its hooked end with a perforated lug projecting from the attaching-plate.

It will be seen that the hook forms a flexible connection between the buckle-frame and the attaching-plate, and allows the frame to move freely in the arc of a circle, of which the hook *b* is the radius. Thus the buckle is enabled to be readily raised from its resting-place on the shoe, and when thus raised the strap can be quickly passed through the frame of the buckle and secured.

The device which I employ in the present case for attaching the hook and buckle to a shoe is shown detached in Fig. 5. It is composed of a plate, *f*, having a perforated projection or staple, *g*, extended at or about at a right angle from it at or near one edge. This projection or staple is to pass through a slit in the material C, to which the buckle is to be attached, and project from the outer side of said material, the plate *f* resting against the inner side. The buckle is applied to the attaching-plate by engaging the hook *b* with the staple *g*, as shown, and thus the buckle is securely attached to the material. As above mentioned, the staple *g* projects from the plate *f* at or near one edge thereof. If said staple projected from the middle of the plate *f*, it will be seen that a draft on the buckle would cause one-half of the plate to be drawn toward the piece or material C, and the other half to be forced away from it, so as to project at an angle from it. Such a plate for holding the staple would, therefore, be likely to injure or wear the leg or stocking of the wearer of a shoe having this attachment applied to it. In my improved attachment, however, the location of the staple at or near one edge of the plate causes the greater portion of the plate to be drawn into the material C, and prevents the edge nearest the buckle from being forced inwardly.

I am aware that an attaching-plate having an eye or hook projecting from the same at or near one edge thereof, and adapted to pass through an opening in a piece of material, has been used for securing buttons, and I do not, therefore, claim such a device. I am also aware that lever-buckles have been constructed in which the lever pivoted to the cross-bar of the buckle-frame is jointed at its rear end to a fastening device which is secured to the article on which the buckle is to be used, the lever being made in one piece, which includes the griping end of the buckle and the end that is jointed to the attaching device. In a buckle of this construction, however, an outward movement of the buckle-frame will cause the lever to turn or swing on its central pivot, and thereby cause the griping end of the lever to be separated from the portion of the buckle-frame with which it co-operates in clamping or griping the strap, and thus release the latter. It is obvious that in shoe-buckles located where such a movement of the buckle-frame is liable to be occasioned by accident, or by the movement of the muscles of the foot at the instep, as in the act of walking, the liability of the strap to be accidentally released would be a great disadvantage. This objection is entirely overcome in my buckle, the tongue or strap-holding part being jointed to the central cross-bar of the buckle independently of the connecting-hook, so that the buckle may be separated or removed from the surface on which it usually rests without altering the relation of the tongue to the buckle-frame or strap, as shown in dotted lines in the drawing. I prefer to make the hook *b* quite narrow at the end which passes through the staple *g*, so that the hook can swing freely in the staple in such manner as to allow the buckle a considerable freedom of lateral motion, thus enabling the buckle to conform automatically to the portion of the boot or shoe on which it bears.

The improvements herein described are applicable to various kinds of buckles besides those named—*i. e.*, besides shoe-buckles.

I claim as my invention—

1. A buckle-frame having a central cross-bar, and a tongue pivoted thereto, combined with a hook pivoted at one end to said cross-bar, and at the other end to an attaching-plate, *f*, substantially as and for the purpose specified.

2. A buckle-frame having a central cross-bar, and a tongue pivoted thereto, combined with a hook pivoted at one end to the cross-bar, independently of the tongue, and at the other end to the attaching-plate *f*, having the eye *g* secured at one side thereof, as set forth.

BARKER C. YOUNG.

Witnesses:
EDMUND B. LITTLE,
C. F. BROWN.